United States Patent

Nakagawa et al.

[11] Patent Number: 5,831,619
[45] Date of Patent: Nov. 3, 1998

[54] SYSTEM FOR GENERATING IMAGE OF THREE-DIMENSIONAL OBJECT SEEN FROM SPECIFIED VIEWPOINT

[75] Inventors: Akira Nakagawa; Akihiro Yamori; Eishi Morimatsu, all of Kawasaki; Hiroshi Harashima, Tokyo; Robert Hsu, Tokyo; Kazuya Kodama, Tokyo, all of Japan

[73] Assignee: Fujitsu Limited, Kawasaki, Japan

[21] Appl. No.: 521,133

[22] Filed: Aug. 29, 1995

[30] Foreign Application Priority Data

Sep. 29, 1994 [JP] Japan .................................. 6-234675

[51] Int. Cl.$^6$ .................................................. G03B 21/32
[52] U.S. Cl. ............................................................ 345/419
[58] Field of Search .................................... 395/118, 119, 395/120, 123, 124; 378/41, 62; 345/418, 419, 420, 423, 424

[56] References Cited

U.S. PATENT DOCUMENTS

| | | | |
|---|---|---|---|
| 5,090,038 | 2/1992 | Asahina ....................................... | 378/41 |
| 5,325,472 | 6/1994 | Horiuchi et al. ........................... | 395/119 |
| 5,566,280 | 10/1996 | Fukui et al. ............................... | 395/119 |
| 5,604,848 | 2/1997 | Harada et al. ............................. | 395/119 |
| 5,613,048 | 3/1997 | Chen et al. ................................. | 395/119 |

OTHER PUBLICATIONS

Chen et al., "View Interpolation for Image Synthesis," *Computer Graphics Proceedings, Annual Conference Series,* 1993, pp. 279–288.

*Primary Examiner*—Cliff N. Vo

[57] ABSTRACT

An image generation apparatus is provided with an image acquisition unit for acquiring images of a three-dimensional object from a plurality of positions along a curve by computer graphics or a television camera. A memory unit stores images obtained by the image acquisition unit. An address generating unit calculates a first address showing the position of the image acquisition and a second address showing the position corresponding to the direction of the line of sight in the image according to the first address, for each line of sight from a specified viewpoint according to the positional information for the viewpoint and the curve at the time of image acquisition. An image generation processing unit combines the image information read from the memory unit by the first and second addresses generated by the address generating unit and generates the image of the three-dimensional object. Display equipment displays the image.

10 Claims, 13 Drawing Sheets

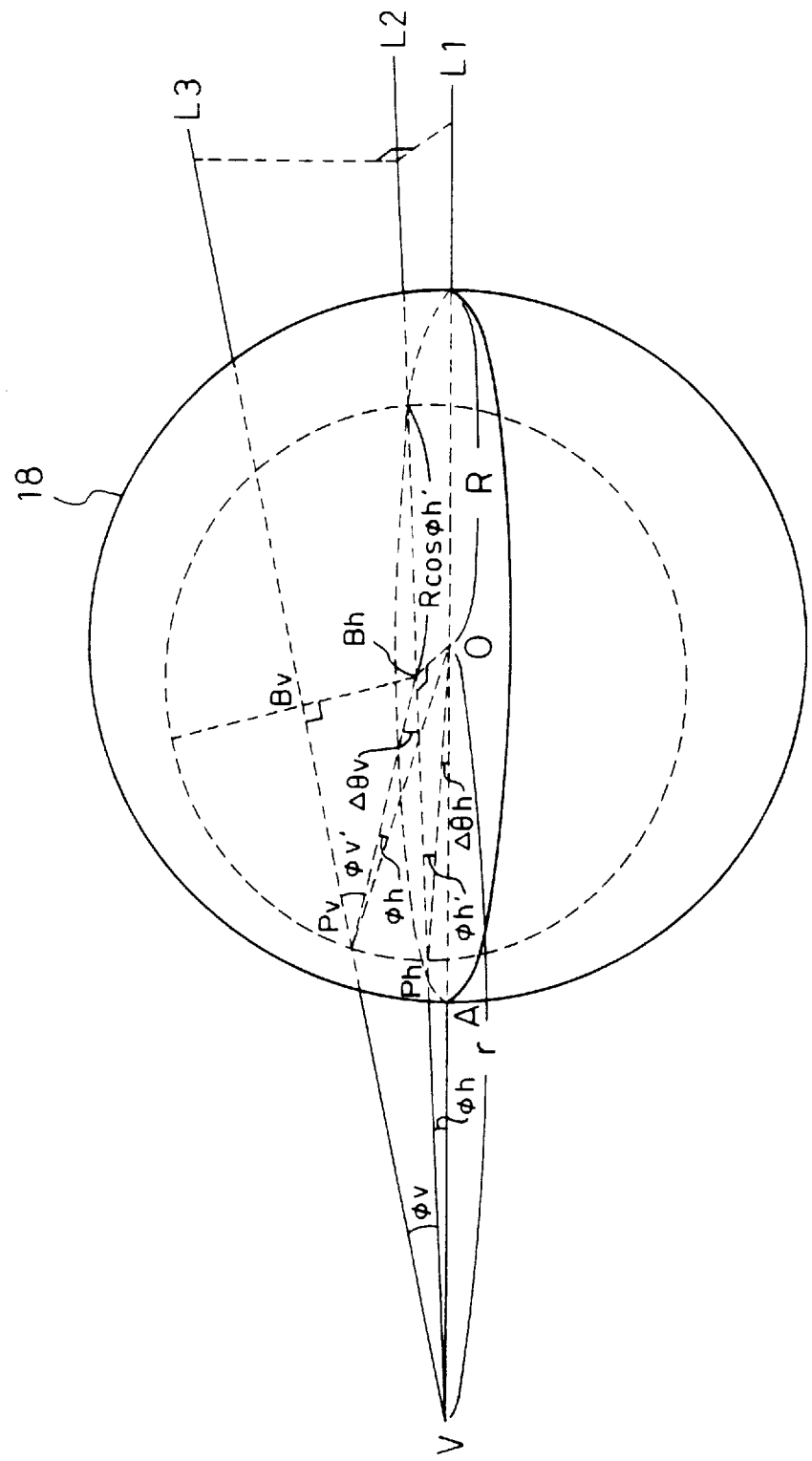

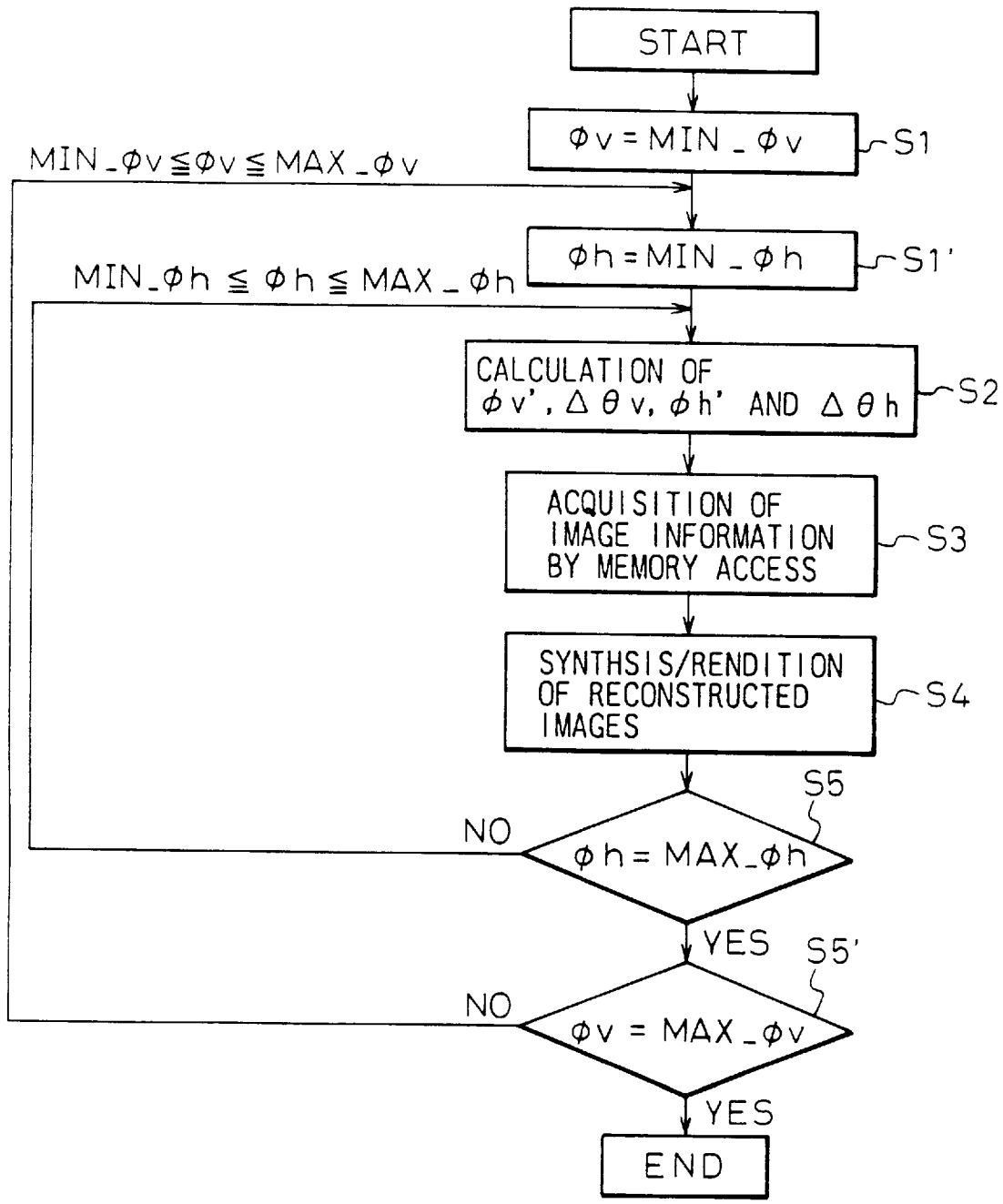

TRANSLATION + ROTATION

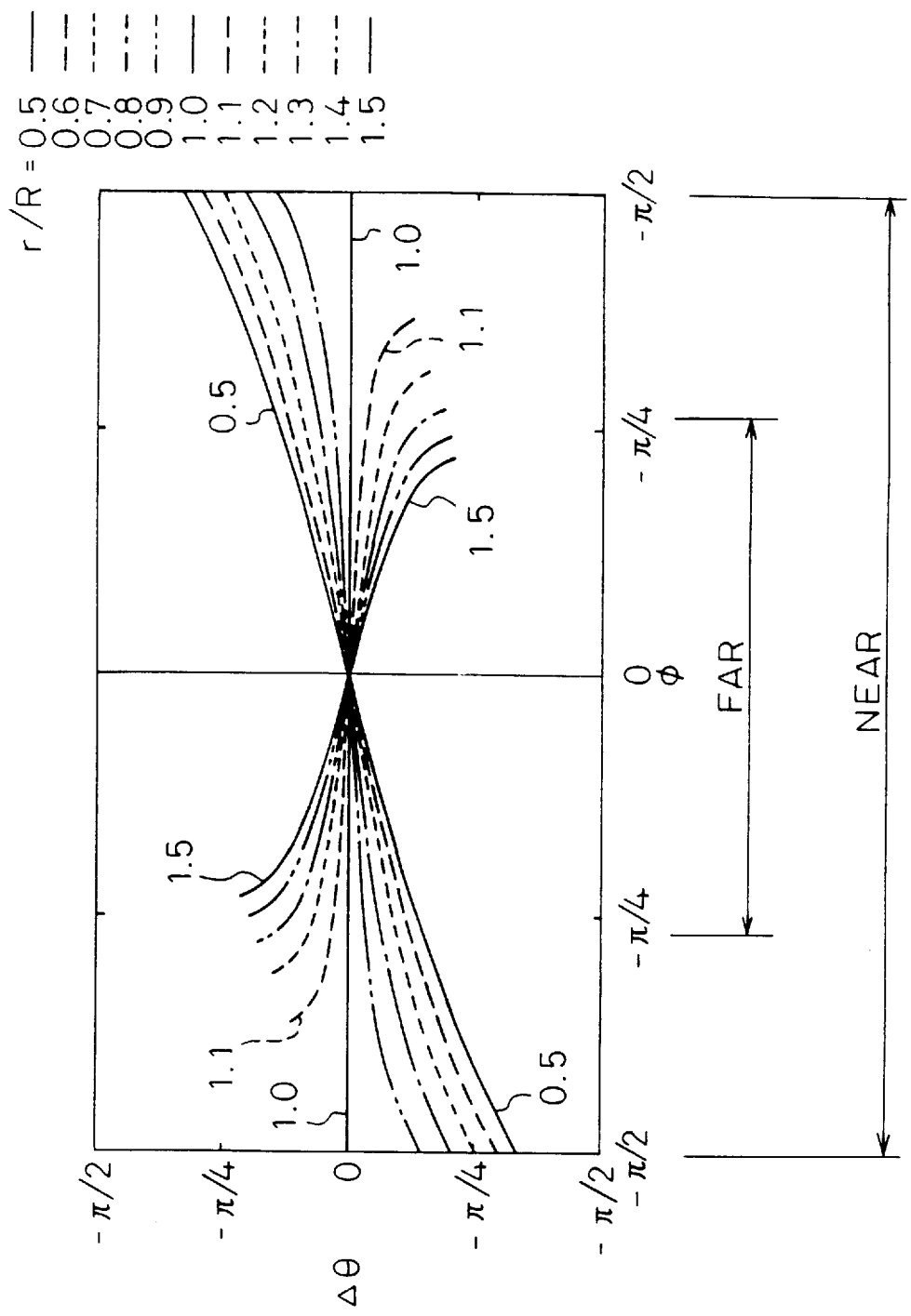

SYSTEM FOR GENERATING IMAGE OF THREE-DIMENSIONAL OBJECT SEEN FROM SPECIFIED VIEWPOINT

BACKGROUND OF THE INVENTION

1. Field of the Invention

The present invention relates to a method and apparatus for generating an image of a three-dimensional object as seen from a specified viewpoint.

By enabling the generation and display of an image from any specified viewpoint, it is possible to evaluate the design of an object or to form a virtual reality environment. It is desirable to realize such image processing fast and economically.

2. Description of the Related Art

One known method for generating and displaying an image from any specified viewpoint is the computer graphic model system. In the computer graphic model system, rendering a realistic image requires an extremely large number of polygons, Z-buffer or ray tracing or other front-back visibility processing is performed. Therefore, the amount of computations required for rendering an image in real time increases enormously along with the complexity of the scene.

It is also possible to display an image from any specified viewpoint by using a movable image pickup, moving it to the position of the specified viewpoint, and then shooting the three-dimensional object, but this has the problem of a larger requisite size of the apparatus. Further, free selection of the path of movement and high speed movement are difficult. Accordingly, it is difficult to form an image of a three-dimensional object specifying any viewpoint. Further, there is known the method of using an image pickup or the computer graphic model system in advance to acquire images of the three-dimensional object from several viewpoints, storing these in a memory unit, and then reading out from the memory unit and displaying the image acquired at the position corresponding to the specified viewpoint.

The computer graphic model system entails processing of a larger number of polygons the more complicated the scene and thereby an increased amount of processing. It requires a high speed computer for generating and displaying an image of a three-dimensional object from any viewpoint in real time. Accordingly, it has the disadvantage of the apparatus becoming extremely expensive.

The method of storing images of a three-dimensional object as seen from a plurality of viewpoints and taking out and displaying the image of the position corresponding to the specified viewpoint suffers from the problem that it is not possible to obtain the image corresponding to any specified viewpoint unless storing images of close to an infinite number of positions. Therefore, various proposals have been made regarding systems for interpolating images. The interpolation system of the related art reconstructs the three-dimensional structure between adjoining images and therefore there is the problem of an increased amount of computation required for the interpolation.

SUMMARY OF THE INVENTION

The present invention has as its object the generation of an image of a three-dimensional object from any specified viewpoint by generation of addresses based on images of the three-dimensional object acquired from different positions.

To attain the above object, the present invention provides an image generation apparatus comprised of an image acquisition means for acquiring images of a three-dimensional object from a plurality of positions along a curve by computer graphics or a television camera, a memory unit for storing the images obtained by the image acquisition means, an address generating unit for calculating a first address showing the position at the time of image acquisition and a second address showing the position corresponding to the direction of the line of sight in the image according to the first address for each line of sight from a specified viewpoint according to the positional information of the viewpoint and a curve at the time of image acquisition, an image generation processing unit for combining the image information read out from the memory unit by the first and second addresses generated by the address generating unit and generating an image of the three-dimensional object, and display equipment for displaying the image.

BRIEF DESCRIPTION OF THE DRAWINGS

The above object and features of the present invention will be more apparent from the following description of the preferred embodiments with reference to the accompanying drawings, wherein:

FIGS. 5A to 5C are views explaining calculation of addresses in the case where the curve 8 is a curved surface;

FIG. 7 is a flow chart for the case of realizing the image processing unit 5 shown in FIG. 1 by software in accordance with the calculation of addresses using the curved surface 18;

FIG. 10 is a view of the characteristic curves between $\phi$ and $\theta$ with respect to r/R.

DESCRIPTION OF THE PREFERRED EMBODIMENTS

Embodiments of the present invention will be described next with reference to the related figures.

Figure 1:
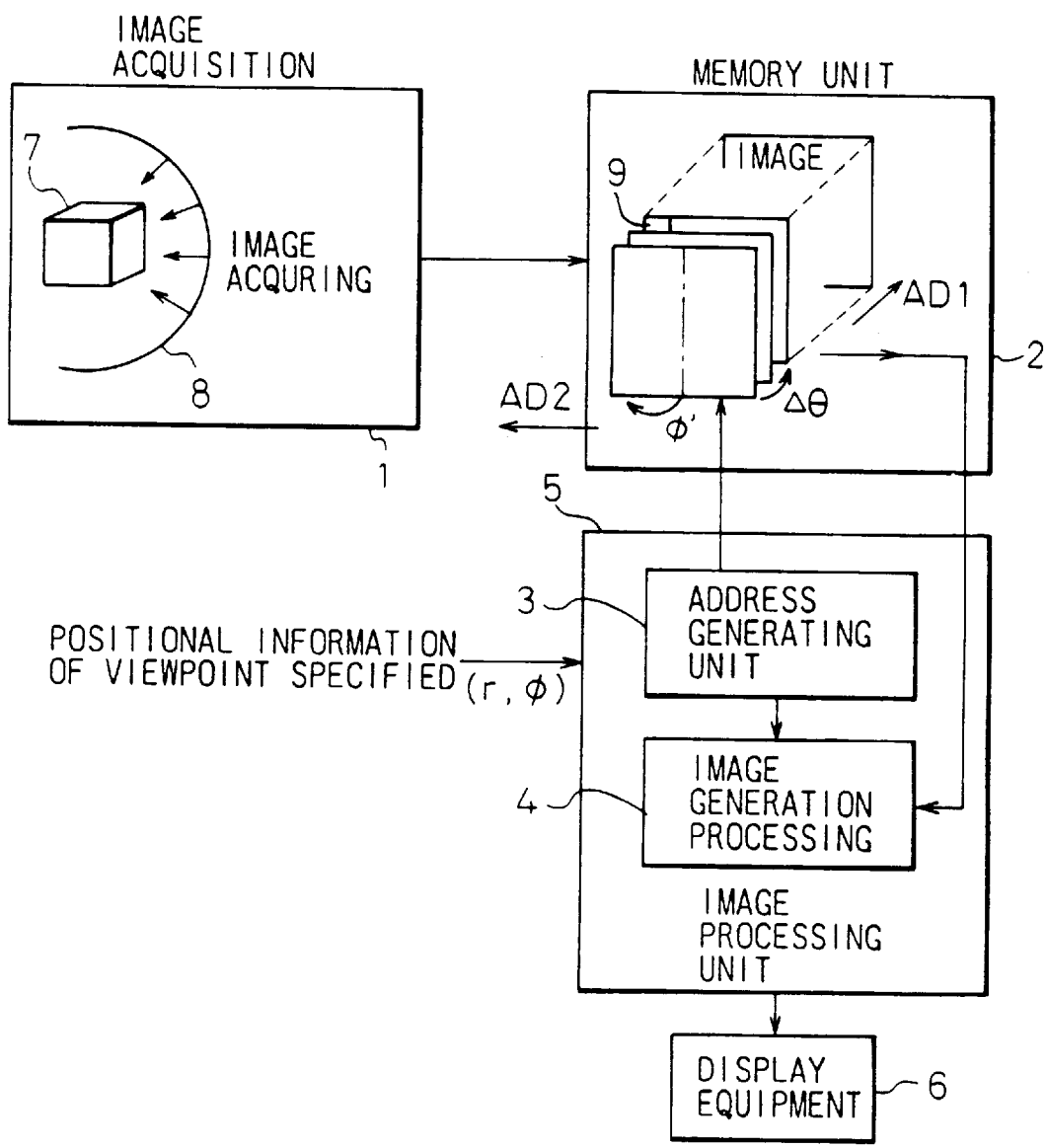
FIG. 1 is a view of the configuration of an image generation system of the present invention.

FIG. 1 is a view of the configuration of an image generation system of the present invention, wherein 1 is an image acquisition means, 2 is a memory unit, 3 is an address generating unit, 4 is an image generation processing unit, 5 is an image processing unit, 6 is display equipment, 7 is a three-dimensional object, and 8 is a curve at the time of image acquisition.

The method of image generation of the present invention used in the system shown in FIG. 1 comprises acquiring images of the three-dimensional object 7 as seen from a plurality of different positions and storing them in the memory unit 2, finding a first address of a position where an image was acquired based on positional information of a specified viewpoint, calculating a second address of an image stored in the memory unit 2 corresponding to the direction of a line of sight from that viewpoint, and combining the image information read by the first and second addresses to generate the image of the three-dimensional object 7 from the specified viewpoint.

That is, the three-dimensional object 7 is shot by a television camera etc. from a plurality of different positions to obtain images 9 or the computer graphic model system is used to acquire images 9 seen from a plurality of different positions. These are stored in the memory unit 2. Accordingly, the memory unit 2 stores images 9 corresponding to the positions of image acquisition. If a viewpoint (V in FIG. 4) is specified, the first address of the position at the time of image acquisition is found based on the positional information of the viewpoint, a second address of the image corresponding to the direction of a line of sight from the viewpoint is calculated, and the image information are read out from the memory unit 2 by the first and second addresses and combined. That is, it is possible to generate an image of the three-dimensional object 7 seen from the specified viewpoint (V) based on the results of address calculation without reconstructing the images stored in the memory unit 2 to a three-dimensional structure.

It is possible to acquire images of the three-dimensional object 7 as seen from a plurality of positions along one or more curves 8 encompassing part or all of the three-dimensional object 7 and store the same in the memory unit 2.

That is, images 9 of the three-dimensional object 7 seen at any intervals along a recess-less single curve 8, such as a circle or ellipse, or plurality of curves at any intervals, encompassing part or all of the three-dimensional object 7, are obtained. That is, the positions of image acquisition become arranged on the curves.

Further, it is possible to acquire images of the three-dimensional object 7 seen from a plurality of positions on a curved surface encompassing part or all of the three-dimensional object 7 and store the same in the memory unit 2.

That is, images 9 of the three-dimensional object 7 seen from a plurality of positions on a recess-less curved surface, such as a spherical surface or elliptical surface, encompassing part or all of the three-dimensional object 7 are obtained. That is, the positions of image acquisition become points on a curved surface.

Further, it is possible to acquire images of the three-dimensional object 7 seen from positions at predetermined intervals along one or more curves 8 on a curved surface encompassing part or all of the three-dimensional object 7 and store them in the memory unit 2, find the intersection between a line of sight from a specified viewpoint and the curve 8 for acquiring the images based on the positional information of the viewpoint and the curve 8, find the angle from the intersection with respect to the direction of the three-dimensional object, find the angle of the line of sight from the intersection with respect to the direction of the three-dimensional object, calculate the first address of the image with the intersection as the image acquisition position and the second address of the position corresponding to the direction of the line of sight of the image, read out the image information stored in the memory unit 2 based on these addresses, combine the image information corresponding to the lines of sight from the viewpoint, and generate the image of the three-dimensional object seen from the specified viewpoint.

That is, images 9 of the three-dimensional object 7 seen from positions at predetermined intervals along one or more curves on a curved surface encompassing part or all of the three-dimensional object 7 are acquired and stored in the memory unit 2. When a viewpoint (V) is specified, the intersection between the line of sight from the viewpoint (V) and the curve 8 is found based on the positional information of the viewpoint and the curve 8 for image acquisition, the angle from the intersection with respect to the direction of the three-dimensional object is found, the angle of the line of sight from the intersection with respect to the direction of the three-dimensional object is found, the first address of the image having the intersection as the image acquisition position is calculated, and the second address of the position corresponding to the line of sight for the image is calculated. The first and second addresses obtained as a result of these calculations are used to read out and combine image information from the memory unit 2.

It is also possible to acquire images of the three-dimensional object 7 seen from positions at predetermined intervals along one or more curves 8 on a curved surface encompassing part or all of the three-dimensional object 7 and store the same in the memory unit 2 and to find the trajectories connecting identical points of the three-dimensional object in the images for each predetermined interval, and interpolate between images based on these trajectories.

That is, the trajectories connecting identical points of the three-dimensional object in the images stored in the memory unit 2 draw curves in the range seen from the positions of image acquisition. Accordingly, even when the intervals between image acquisition positions are large, interpolation between images based on the trajectories drawing the curves becomes possible and it becomes possible to slash the number of images 9 stored in the memory unit 2.

It is also possible to find the amount of motion and direction of motion between frames for a moving three-dimensional object and move the curve 8 for acquiring the images of the three-dimensional object in accordance with that amount of motion and direction of motion to generate the addresses.

That is, a moving three-dimensional object can be sensed as to its amount of motion and direction of motion by finding the difference between frames. Accordingly, the curve 8 for acquiring images 9 of the three-dimensional object is moved in accordance with the amount of motion and direction of motion. That is, the addresses on the curve 8 are translated or rotated in accordance with the translation or rotation. Accordingly, it is possible to generate a read address or image generation address using the positional information of the specified viewpoint based on the translated or rotated curve 8.

The image generation apparatus of the present invention, constituting the system shown in FIG. 1, is comprised of an image acquisition means 1 for acquiring images of a three-dimensional object 7 from a plurality of positions along a curve 8 on a curved surface encompassing part or all of the three-dimensional object 7, a memory unit 2 for storing the images obtained by the image acquisition means 1, an address generating unit 3 for calculating a second address for reading of each image information corresponding to each line of sight from a specified viewpoint based on the positional information of the specified viewpoint and the first address of the position of image acquisition, an image generation processing unit 4 for combining the image information read from the memory unit 2 by the read addresses by the address generating unit 3 to generate the image of the three-dimensional object seen from the specified viewpoint, and display equipment 6 for displaying the image generated by the image generation processing unit 4. In this case, in FIG. 1, the address generating unit 3 and the image generation processing unit 4 together form the image processing unit 5.

That is, the image acquisition means 1 acquires the images 9 of the three-dimensional object by a television camera or computer graphics. The acquired images 9 are stored in a memory unit 2 comprised of a semiconductor memory or magnetic disk apparatus or the like. The address generating unit 3 calculates the address of the position of image acquisition (first address) based on the positional information of the specified viewpoint and the read address (second address) for reading the image information corresponding to each line of sight from the specified viewpoint. The image generation processing unit 4 combines the image information read from the memory unit 2 in accordance with the read addresses (first and second addresses) to generate an image of the three-dimensional object as seen from the specified viewpoint. The display equipment 6 is comprised of cathode ray tube (CRT) display equipment, liquid crystal display equipment, etc. and displays the generated image.

The address generating unit 3 is designed to calculate the intersection of the curve 8 for image acquisition and the line of sight from a specified viewpoint based on the positional information of the viewpoint, calculate the angle from the intersection with respect to the direction of the three-dimensional object, find the angle of the line of sight from the intersection with respect to the direction to the three-dimensional object, and calculate the first address of the image at the intersection as the image acquisition position and the second address of the position corresponding to the direction of the line of sight for the image.

The address generating unit 3 calculates the intersection of the line of sight from the specified viewpoint and the curve 8 for image acquisition based on the positional information of the viewpoint and the curve 8, calculates the angle of the intersection with respect to the direction of the three-dimensional object, and finds the angle of the line of sight seen from the intersection in the direction to the three-dimensional object and thereby calculates the first address of the image at the intersection as the position of image acquisition and the second address of the position corresponding to the direction of the line of sight of the image in that case. It repeats the calculation of the address for each line of sight from the viewpoint.

The image generation processing unit 4 is configured to interpolate between images based on the trajectories connecting identical points of the three-dimensional object 7 in images stored in the memory unit 2.

That is, since the trajectories connecting identical points of the three-dimensional object 7 in the images stored in the memory unit 2 draw curves in the range visible from the positions of image acquisition, the image generation processing unit 4 can interpolate between images based on the curves.

Below, a more detailed explanation will be given of the configuration of the system of FIG. 1.

The memory unit 2 may be comprised of a semiconductor memory, a magnetic disk device, or other relatively large capacity memory unit. Further, the image processing unit 5, including the address generating unit 3 and the image generation processing unit 4, can be easily realized by a computer having an arithmetic processing function. Further, the display equipment 6 can be comprised, as mentioned above, of a cathode ray tube (CRT) display equipment, liquid crystal display equipment, etc.

Figure 2:
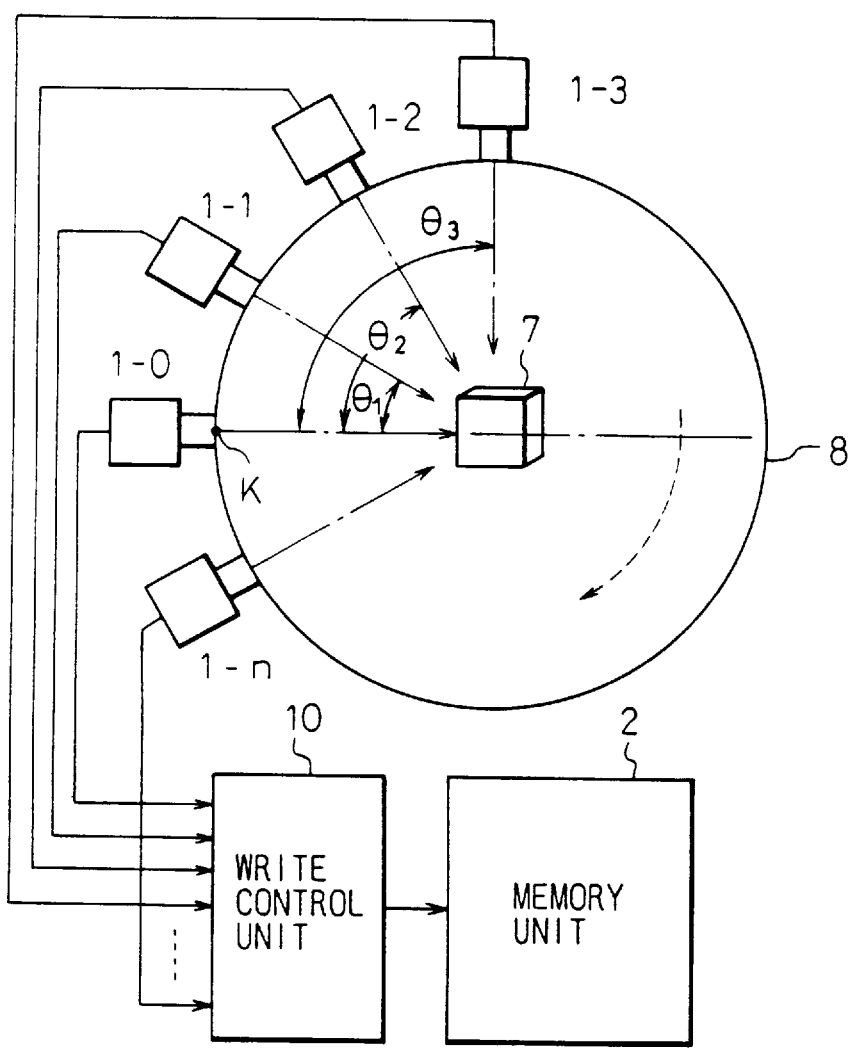
FIG. 2 is a view explaining an image acquisition means.

The image acquisition means 1 can be comprised of television cameras or computer graphic system. FIG. 2 shows an example of the case of use of television cameras. References 1-0, 1-1, . . . , 1-n respectively indicate television cameras, 2 a memory unit, and 8 a curve encompassing the three-dimensional object 7. In this case, the curve 8 shows a circle centered about the three-dimensional object 7. Reference numeral 10 is a write control unit.

The television camera 1-0 is used as the home position and the other television cameras 1-1, 1-2, 1-3, . . . are arranged at intervals of the angles $\theta_1$, $\theta_2$, $\theta_3$, . . . along the curve 8. These positions become the image acquisition positions. The three-dimensional object 7 is shot by the television cameras 1-0 to 1-n. In this case, it is also possible to move one television camera along the curve 8 to the positions of the angles $\theta_1$, $\theta_2$, $\theta_3$, . . . and shoot the three-dimensional object 7 there. The images 9 which are shot become the images of the three-dimensional object 7 as seen from the plurality of positions and are successively stored in the memory unit 2 under the control of the write control unit 10.

The case is shown where the curve 8 on which the television cameras 1-0 to 1-n are arranged is a circle encompassing all of the three-dimensional object 7 in FIG. 2. This curve 8 may also be made an arc etc. encompassing part of the three-dimensional object 7. Further, it may be made a recess-less ellipse or any other curve. Further, a spherical surface is generally used as the curved surface encompassing part or all of the three-dimensional object 7, but it may be made any curved surface such as an elliptical surface. Further, the intervals at which the television cameras 1-0 to 1-n are arranged (intervals at which the images are acquired) are generally equal, but can also be made unequal. Further, it is possible to acquire images of the three-dimensional object 7 along a plurality of curves of equal intervals or unequal intervals.

Figure 3:
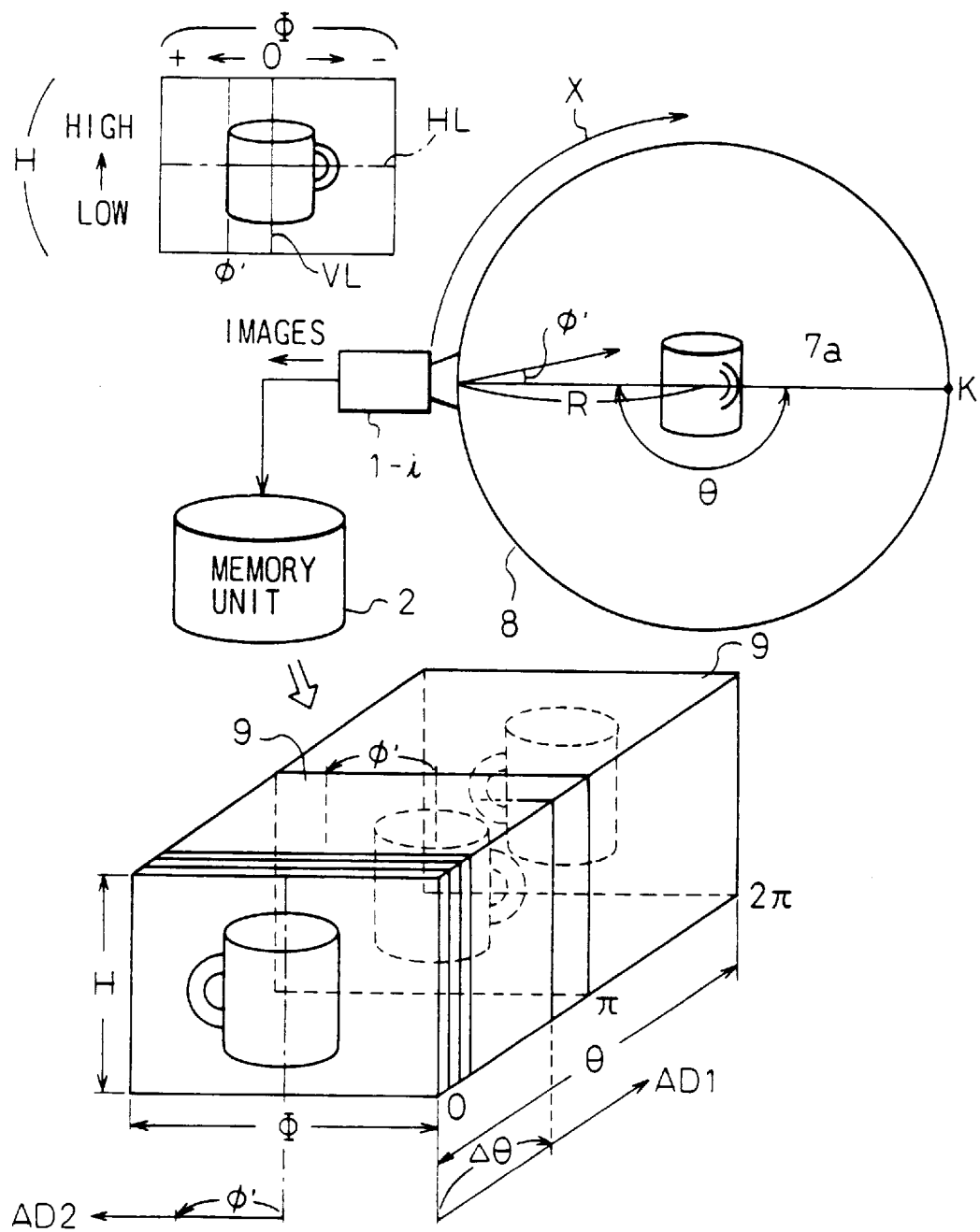
FIG. 3 is a view explaining the state of storing images.

FIG. 3 is a view explaining the state of storing images. It shows the case where a single television camera 1-i is moved in the arrow X direction along a circle of the radius R centered around a coffee cup 7a, serving as the three-dimensional object 7, so as to successively shoot the coffee cup 7a and store the images in the memory unit 2.

The image at the point of the angle $\theta=\pi$ from the home position ($\theta=o$) is shown at the top left of FIG. 3. In this case, the height H of the vertical axis corresponds to the number of the horizontal scanning lines, the angle $\Phi$ of the horizontal axis is 0 for the vertical line centered on the image seen from one point on the curve 8, positive (+) at the left side of the screen, and negative (−) at the right side. The angle at the side of the coffee cup 7a is $\phi'$. Further, VL is the vertical line centered on the image, and HL is the horizontal line centered on the image. Further, if $\theta$ is increased in the range of $o \leq \theta \leq 2\pi$ and images of the coffee cup 7a are successively acquired in the arrow X direction from the home position K and stored in the memory unit 2, the group of images 9 acquired along the curve 8 is built up as shown by the bottom half of FIG. 3.

In FIG. 3, the case is shown of acquisition of images 9 along the curve 8 encompassing all of the coffee cup 7a used as the three-dimensional object 7, but it is also possible to acquire images 9 along the curve of part of the coffee cup 7a, for example, the range of $\theta=o$ to $\theta=\pi$, and store them in the memory unit 2. In this case, the images shown at the bottom half of FIG. 3 also fall in the range of $\theta=o$ to $\theta=\pi$. Further, the case is shown of acquisition of the images along a single curve 8, but it is also possible to acquire images along a plurality of curves. In this case, the memory unit 2 stores a number of groups of images corresponding to the number of curves for image acquisition.

Figure 4:
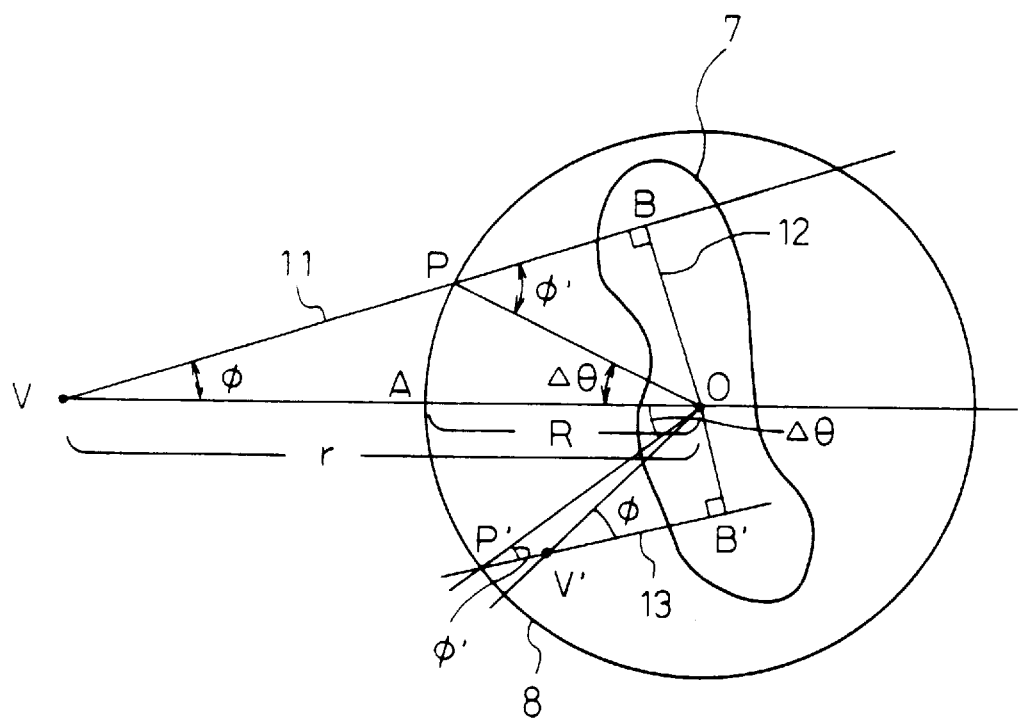
FIG. 4 is a view explaining calculation of addresses.

FIG. 4 is a view explaining calculation of addresses. An explanation is made of the case of making the curve 8, at the time of image acquisition, a circle of the radius R. Based on the positional information of the specified viewpoint V and the curve 8 for acquiring the images of the three-dimensional object, the first address AD1 and the second address AD2 for image generation are calculated and the image information selected from the image group 9 are combined. First, an explanation will be made of the calculation of addresses when specifying a viewpoint V outside of the curve 8 at the time of image acquisition, that is, when generating an image of a three-dimensional object 7 as seen from a position far from the image acquisition position with respect to the origin o.

Consider the case of specifying as the viewpoint V the position of a distance r from the center o of the circle (8) of the radius R. The image information when viewing along certain direction ($\phi$) from the viewpoint V becomes certain image information of the image seen from the position of a point P, that is, the intersection of the line in that direction (line of sight 11) and the circle 8. That is, if the intersection between the line Vo connecting the viewpoint V and the center o of the circle 8 and the circle is made A, the angle formed between the line Vo and the line VP showing the direction of the light of sight 11 is made $\phi$, and the angle formed between the line Po connecting the point P and the center o of the circle and the line VP is made $\phi'$, the image of B seen from the viewpoint V becomes equal to the image information in the direction of the angle $\phi'$, from the line Po. The image of the three-dimensional object 7 seen from the line Po, referring to FIG. 2, is captured by the television camera 1-1 at the angle $\theta_1$ close to $\Delta\theta$ of FIG. 4 and is already stored in the memory unit 2. The image (9$\phi'$) in the direction of the angle $\phi'$ from the line Po is present in the image information which is built up. This image information (9$\phi'$) can be used to reproduce the image of B as seen from the viewpoint V.

In the final analysis, the image at the angle $\phi$ seen from the viewpoint V at the distance r from the center o, referring to FIG. 1 and FIG. 3, can be reproduced as the image information determined by the address $\Delta\theta$ in the first address (AD1) and the address $\phi'$ in the second address (AD2) in the memory unit 2. Then, the relationship of the first address AD1 ($\Delta\theta$) and the second address AD2 ($\phi'$) with respect to the viewpoint V (at the distance of r from the center o) and the angle $\phi$ (angle of VP with respect to Vo) is found. FIG. 4 is for finding this relationship. Based on this, it is possible to calculate the first and second addresses ($\Delta\theta$, $\phi'$).

In FIG. 4, if the intersection between the vertical line 12 from the center o of the circle 8 down to the line VP and the line 11 (VP) is made B, the line Bo becomes:

$$Bo = r \times \sin \phi = R \times \sin \phi' \quad (1)$$

From this relationship, the following is obtained:

$$\phi' = \sin^{-1}\{(r/R) \times \sin \phi\} \quad (2)$$

Further, the angle formed by the line Ao and the line Po, that is, the angle between the direction of viewing the viewpoint V from the center o of the circle 8 and the direction of viewing the point P, is made $\Delta\theta$, $$\Delta\theta = \phi' - \phi \quad (3)$$

From equation (3) and equation (2), the following relationship is obtained:

$$\Delta\theta = \sin^{-1}\{(r/R) \times \sin \phi\} - \phi \quad (4)$$

In the end, if the viewpoint V is specified by the parameters r, R, and $\phi$, the first address AD1 ($\Delta\theta$) is found from the above equation (4) and the second address AD2 ($\phi'$) is found from the above equation (2).

As explained above, the image information of the three-dimensional object 7 seen from the viewpoint V in the direction of the angle $\phi$ with respect to the line Vo matches the image information seen from the intersection P, found between the line oP leading from the center o of the circle 8 in the direction of the angle $\Delta\theta$ with respect to the line Vo and the circle 8, in the direction of the angle $\phi'$ with respect to the line Po. Accordingly, by successively finding the point P and the angle $\phi'$ (see equation (2)) based on the specified viewpoint V and corresponding to each $\phi$ while changing the angle $\phi$ (direction of line of sight), it is possible to generate addresses ($\Delta\theta$, $\phi'$) for generating the image of the three-dimensional object 7 from the viewpoint V. That is, the intersection P corresponds to the $\theta$ in FIG. 3, so the address ($\Delta\theta$) of the image obtained at the point P as the image acquisition position is calculated and further the address of the direction of $\phi'$ from the center for that image, that is, the position corresponding to the line of sight (11) direction, i.e., the address (AD2) showing the $\phi'$ from the vertical line VL at the center of the image at, e.g., $\theta=\pi$ in FIG. 3, is calculated and successively changes the angle $\phi$ (line of sight direction) from the specified viewpoint V and repeats the address calculation. By using the thus calculated addresses (AD1, AD2), the image information is read out from the memory unit 2 and combine the same to generate the image of the three-dimensional object from the specified viewpoint.

The above-mentioned embodiment shows the case where the viewpoint V is specified outside of the circle 8 of image acquisition, but it is also possible to generate addresses in the same way even when specifying it inside the circle 8. That is, when the viewpoint V' is specified as shown in FIG. 4, the image information of the angle $\phi$ (line of sight direction) with respect to the line V'o connecting the viewpoint V' and the center o of the circle 8 can be obtained by finding the intersection of the line 13 of that direction and the circle 8 and making the distance between the viewpoint V' and the center o r and thereby extracting the image information and generating addresses (AD1, AD2) for generating the image seen from V' based on the above equations (1) to (4). Further, in the case of a curve other than the circle, similarly, the intersection between the specified viewpoint and the curve and the intersection between the line of sight from the specified viewpoint and the curve are found to generate the addresses in the same way as explained above.

Figure 5B:
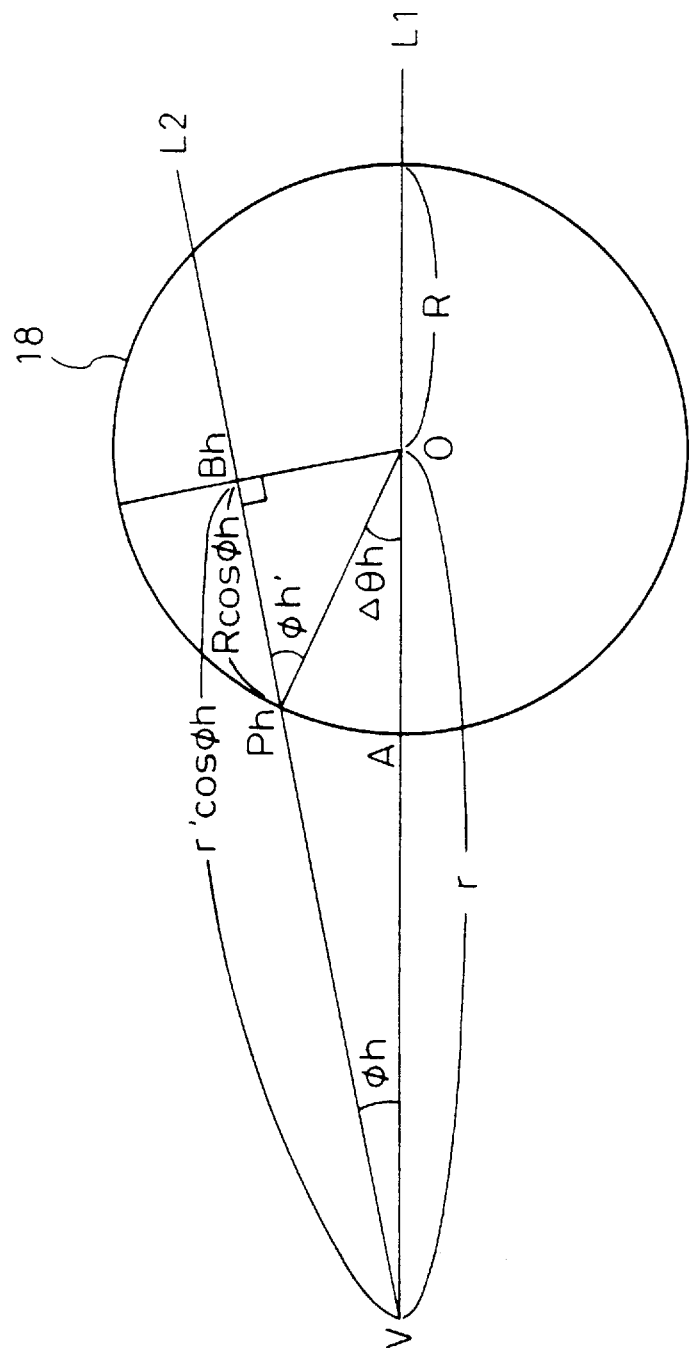
Figure 5C:
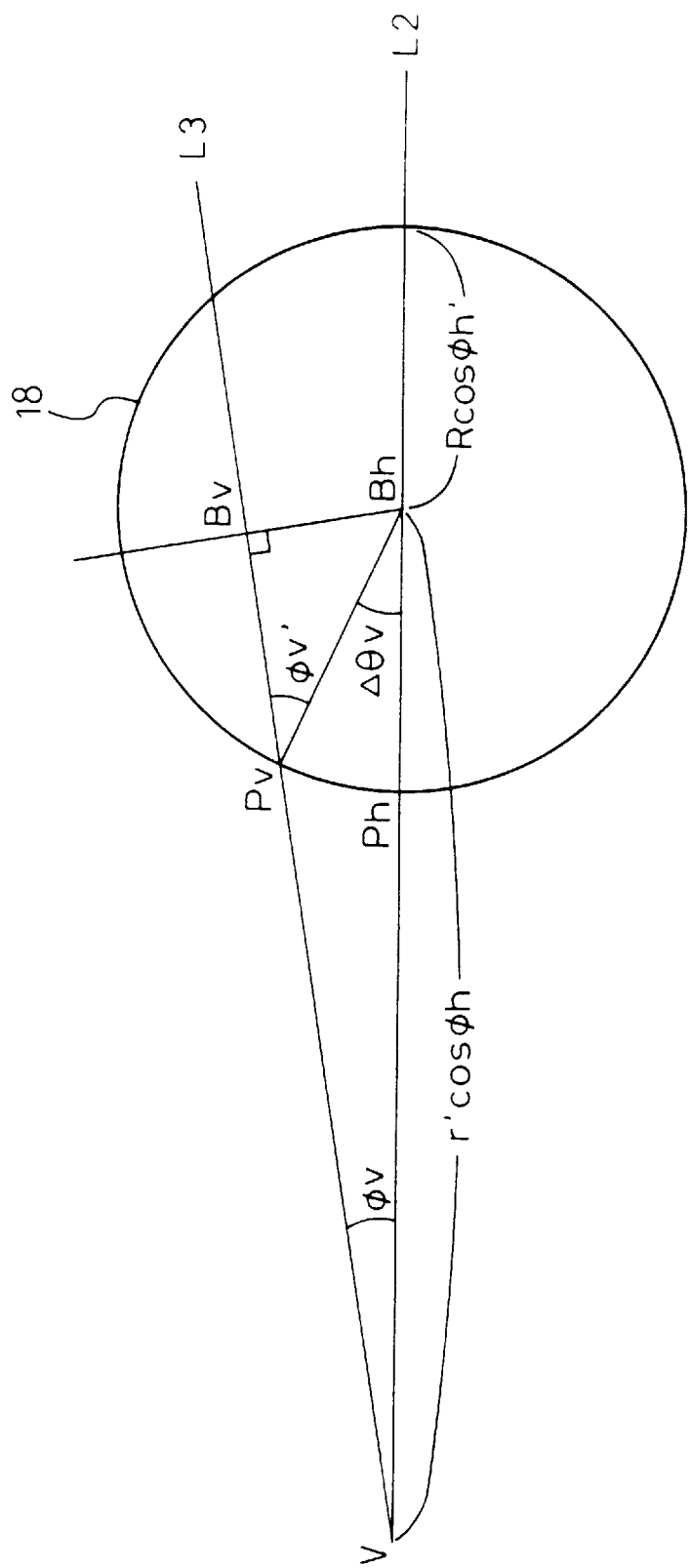

FIGS. 5A, 5B, and 5C are views explaining the calculation of addresses in the case where the curve 8 of FIG. 4 is a curved surface rather than a simple circle.

As shown in FIG. 5A, it is understood, if it is possible to use the curved surface (sphere) 18 instead of the curve (circle) to acquire the image information seen from any position of the curved surface in any direction, then it is possible to generate an image as seen from any spatial position.

In this case, to obtain the image information of a position shifted by the angle $\phi$h in the horizontal direction and the angle $\phi$v in the vertical direction from the line Vo connecting the viewpoint V and the center o of the sphere, it is sufficient to fetch the image information in the direction shifted by $\phi$h' in the horizontal direction and $\phi$v' in the vertical direction using as a front face the direction viewing the center o of the sphere from the point Pv on the sphere 18. If the positional information ($\Delta\theta$h, $\phi$h', $\Delta\theta$v, and $\phi$v') of the viewpoint V with respect to the angle φh and the angle φv is determined, it is possible to generate an image seen from the viewpoint V by changing the parameters of the values of the angle φh and the angle φv.

More specifically, the radius of the sphere 18 is made R, the center of the sphere 18 is o, any viewpoint is made V, and the distance between the point V and the point o is made r. The line connecting the point V and the point o is made the line L1. When viewed from the viewpoint V, the intersection between the line of the direction shifted by the angle φh from the horizontal direction and the sphere 18 is made Ph and the line connecting the point V and the point Ph is made the line L2. Further, the angle formed between the line Ph–o and the line L1 is made φθh. The intersection of the vertical line down to the line L2 and the line L2 from the center o of the sphere 18 is made Bh. The angle formed between the line Ph–o and the line Ph–Bh is made φh'. Further when viewed from the viewpoint V, the intersection between the line of the direction shifted by the angle φv from the vertical direction and the sphere 18 is made Pv and the line connecting the point V and the point Pv is made the line L3. Further, the angle formed between the line Pv–o and the line L2 is made φθv. The intersection of the vertical line down to the line L3 from the point Bh and the line L3 is made Bv. The angle formed between the line Pv–Bh and the line Pv–Bv is made φv'. The positional information (Δθh, φh', Δθv, and φv') of the viewpoint V is found in the following way.

First, in FIG. 5A, consider a horizontal plane including the line L1 and the line L2 as shown in FIG. 5B. The relationship among φh, φh', and φθh is the same as the case where image information is obtained using the curve (circle) 8. That is, the equations corresponding to the aforesaid equations (1) to (4) stand:

$$oBh = r \times \sin \phi h = R \times \sin \phi h' \quad (5)$$

$$\phi h' = \sin^{-1}\{(r/R) \times \sin \phi h\} \quad (6)$$

$$\Delta \theta h = \phi h' - \phi h \quad (7)$$

$$\Delta \theta h = \sin^{-1}\{(r/R) \times \sin \phi h\} - \phi h \quad (8)$$

Next, as shown in FIG. 5C, consider the vertical plane including the line L2 and the line L3. The radius of the circle of FIG. 5C is R cos φh' as will be understood viewing FIG. 5B. The distance between the point V and the point Bh is r×cos φh as will be understood viewing FIG. 5B. The relationship among φv, φv', and Δθv of FIG. 5C can be calculated in the same way. That is, the equations corresponding to equations (1) to (4) become:

$$BhBv = r \times \cos \phi h \times \sin \phi v = R \cos \phi h' \times \sin \phi v' \quad (9)$$

$$\phi v' = \sin^{-1}\{(r \times \cos \phi h/R \cos \phi h') \times \sin \phi v\} \quad (10)$$

$$\Delta \theta v = \phi v' - \phi v \quad (11)$$

$$\Delta \theta v = \sin^{-1}\{(r \times \cos \phi h/R \cos \phi h') \times \sin \phi v\} - \phi v \quad (12)$$

Here, equations (10) and (12) become as shown in equations (13) and (14) by substituting equation (6) in them:

$$\phi v' = \sin^{-1}\{(r \times \cos \phi h/R \cos (\sin^{-1}\{(r/R) \times \sin \phi h\})) \times \sin \phi v\} \quad (13)$$

$$\Delta \theta v = \sin^{-1}\{(r \times \cos \phi h/R \cos (\sin^{-1}\{(r/R) \times \sin \phi h\})) \times \sin \phi v\} - \phi v \quad (14)$$

Accordingly, the image information using the center of the sphere 18 as o and positioned shifted from the viewpoint V by the angle φh in the horizontal direction and the angle φv in the vertical direction can be obtained by expressing the addresses (Δθh, φh', Δθv, φv') on the sphere by the equation (6), equation (8), equation (13), and equation (14), finding them by the given positional information (R, r, φh, φv), and generating the image information positioned at those addresses.

Figure 6:
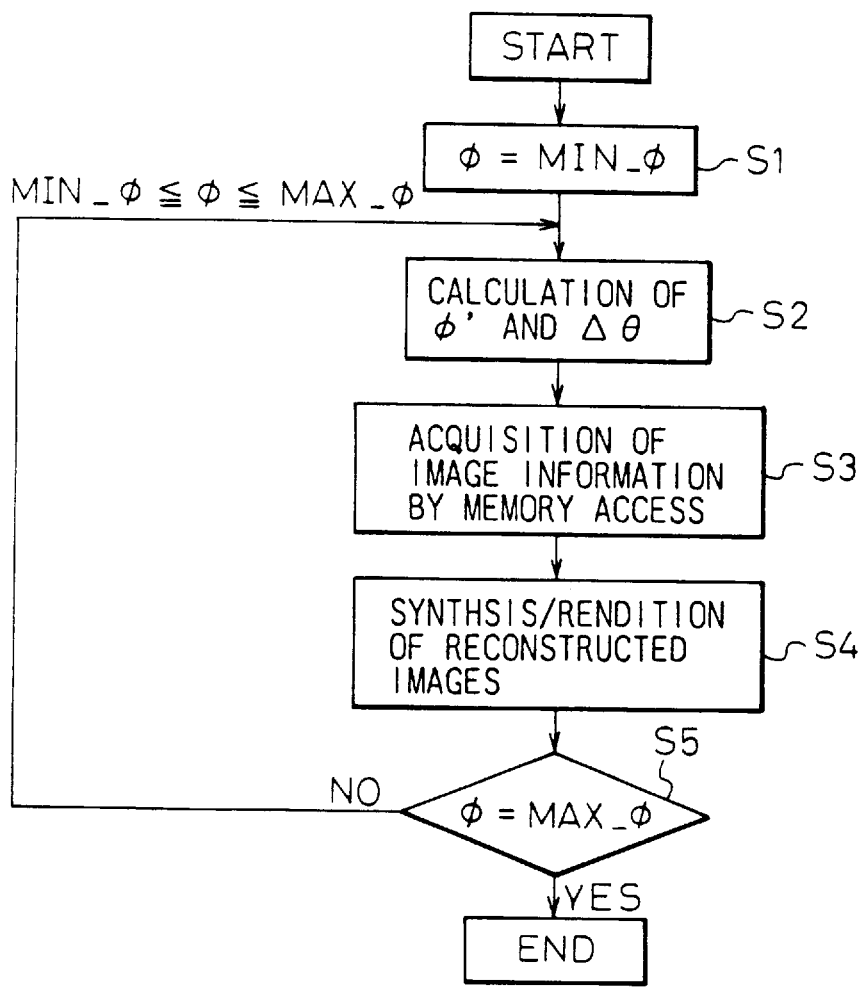
FIG. 6 is a flow chart for the case of realizing the image processing unit 5 shown in FIG. 1 by software in accordance with the calculation of addresses using the curve 8.

FIG. 6 will be explained first referring to FIG. 4.

Step S1: The minimum value MIN_φ of the angle φ is set.

Step S2: The first address AD1 (Δθ) and the second address AD2 (φ') are calculated in accordance with equations (1) to (4).

Step S3: The above addresses AD1 and AD2 are used to access the memory unit 2 (FIG. 3) and acquire the image information sought for.

Step S4: The image information obtained at step S3 is held.

Step S5: The above steps S1 to S4 are repeated until the angle φ becomes the maximum value MAX_φ. At step S4, the image information obtained for each angle φ by this repetition is cumulatively combined to generate the reproduced picture.

The flow chart of FIG. 7 is basically the same as the flow chart of FIG. 6. In FIG. 7, the steps corresponding to the steps of FIG. 6 are shown given the same references. The flow chart of FIG. 7 includes the acquisition of three-dimensional images from around the sphere 18, so the angle φ becomes the two parameters (φv and φn. Therefore, the steps S1 and S1' exist corresponding to φv an φh. Further, the steps S5 and S5' exist.

Referring again to FIG. 3, however, the more the number of the images 9 obtained along the first address (Δθ) the better. When too numerous, however, the capacity of the memory unit 2 becomes excessive, which is uneconomical.

Therefore, the number of images 9 is made, for example, 10 and just the 10 images 9 are stored in the memory unit 2. If a further one or more images becomes necessary between two adjoining images 2, these virtual images are found by calculation from the actually stored image information of the two adjoining images 9. If this is done, then the equivalent of storage of a large number of images in a small capacity memory unit 2 is obtained, which is economical.

Figure 8A:
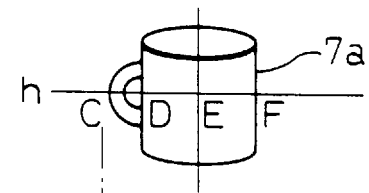
FIGS. 8A, 8B, and 8C are views explaining the trajectories among images.
Figure 8B:
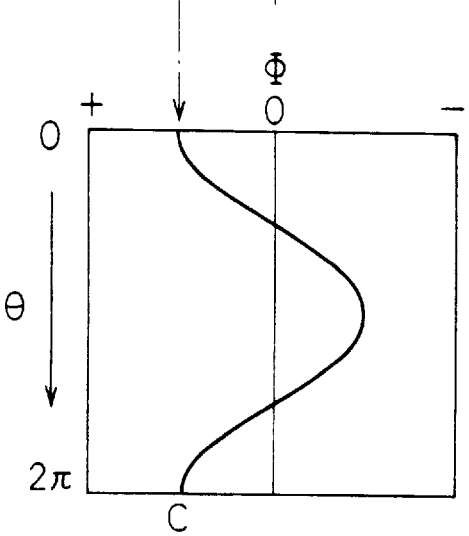

Various techniques exist for realizing the above calculations. One example is the technique of interpolation described in U.S. Ser. No. 08/400,756. This interpolation technique is as follows:

The trajectories connecting identical points of the three-dimensional object in the group of images of the three-dimensional object acquired seen from a plurality of viewpoints and stored in the memory unit 2 draw curves. For example, for the point C at the height h (horizontal line) of the coffee cup 7a shown in FIG. 8A, the trajectory among the images in the group of images in the range of the angle θ=0 to θ=2π shown in FIG. 3 (trajectory connecting the identical points of the coffee cup 7a seen by the same horizontal line of the images) becomes that shown in FIG. 8B. Further, the trajectories for the points C, D, E, and F of the coffee cup 7a shown in FIG. 8A become those shown in FIG. 8C. The images in this case, as shown in FIG. 3, are acquired along the circle 8 of the radius R centered on the coffee cup 7a. When disposed other than at the center o of the circle or when acquired along a curve other than a circle, such as an ellipse, the shapes of the trajectories differ.

Figure 8C:
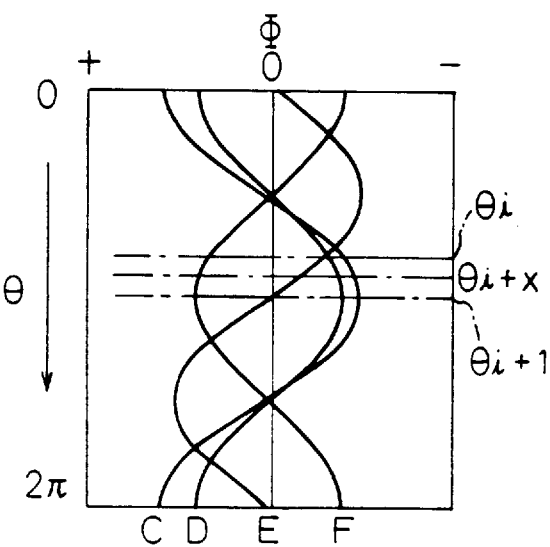

The trajectories connecting the identical points of the three-dimensional object 7 in this way draw the curves shown in FIG. 8C. The curves can be approximated by tertiary equations or other approximation equations. This means that it is easy to interpolate among images by approximation equations even when the interval of image acquisition of the three-dimensional object 7 is large. For example, the image at the position of $\theta_{i+x}$ can be generated, with respect to the images 9 acquired at the positions of $\theta_i$ and $\theta_{i+1}$, by approximation by an approximation equation based on the addresses of the points C, D, E, and F of the images obtained at the positions of $\theta_i$ and $\theta_{i+1}$. Accordingly, even if the intervals of positions of image acquisition are great, it is possible to generate an image between acquired positions by interpolation. Accordingly, it is possible to cut the required memory capacity of the memory unit 2.

Figure 9A:
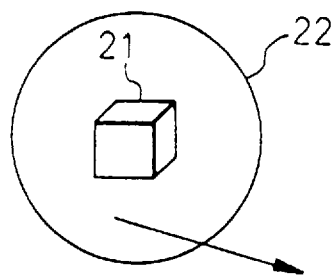
FIG. 9 is a view explaining the motion of a three-dimensional object.
Figure 9B:
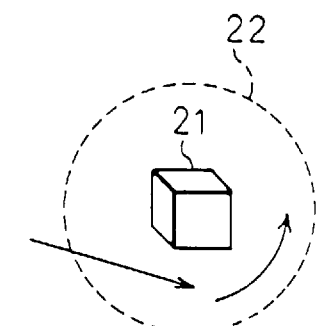

FIG. 9 is a view explaining motion of a three-dimensional object. The three-dimensional object 21 in the moving image information is a rigid body. When this three-dimensional object 21 moves, it is possible to use the difference of the three-dimensional object between frames to detect the distance of motion, the amount of motion and direction of motion of the rotational angle, and the direction of motion of the rotational direction.

Therefore, when generating an image of the three-dimensional object 21 from any specified viewpoint V, by moving the curve 22 (similar to the curve 8) for image acquisition along with that amount of motion and direction of motion, it is possible to generate an image from any viewpoint V after the motion. For example, when the three-dimensional object 21 is translated and rotated, it is possible to generate an image according to the present invention by translation and rotation of the curve 22 for the image acquisition as well.

FIG. 10 is a view of the characteristic curves between $\phi$ and $\Delta\theta$ with respect to r/R. It shows the relationship between the angle $\phi$ between the line Vo and the line VP in FIG. 4 (direction of line of sight) and the angle $\Delta\theta$ between the line Vo and the line Po in the case of r/R changed from 0.5 to 1.5 in steps of 0.1.

Referring to FIG. 4, the image information of the object 7 stored in the memory unit 2 is only the image information of the three-dimensional object 7 seen from the circle 8. Accordingly, even if the viewpoint V is made far from the center o, that is, even if the angle $\phi$ of the field becomes wider, the images reproduced from the viewpoint V are limited to images within the angle from V to the two ends of the object 7. That is, only the $\Delta\theta$ in the narrow range corresponding to the "far" range becomes effective.

Conversely, if the viewpoint V is brought near to the center o, the angle $\phi$ of the field able to catch the images of the object 7 becomes wider, that is, the $\Delta\theta$ of the wide range corresponding to the "near" range of FIG. 10 becomes effective.

For example, when the distance r between the specified viewpoint V and the center o of the circle are equal, that is, when r/R=1, if the viewpoint V is specified on the circle 8, then $\Delta\theta$ becomes zero regardless of $\phi$. Further, when r/R<1 (NEAR), that is the viewpoint V has been specified at the inside of the circle 8, the angle $\phi$ can reach close to $\pi/2$ with respect to the line Vo. Further, when r/R>1 (FAR), that is the viewpoint V has been specified at the outside of the circle 8, the angle $\phi$ can only be changed up to close to $\pi/4$.

Figure 11:
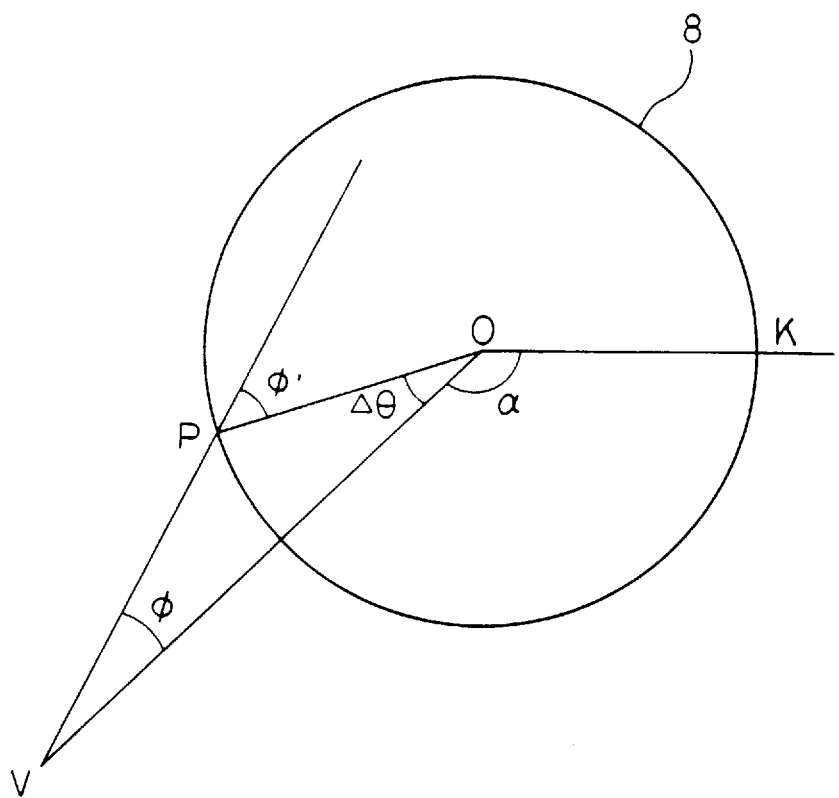
FIG. 11 is a view explaining the position of a point P from a home position.

When the relation between the specified viewpoint V and the home position K at the time of image acquisition for example is as shown in FIG. 11, that is, it is easy to find the offset angle $\alpha$ between the line Ko connecting the center o of the circle 8 and the home position K and the line Vo connecting the center o of the circle and the viewpoint V. Further, the intersection P between the line of sight at the angle $\phi$ from the viewpoint V and the circle is found in the above way, whereby the angle $\Delta\theta$ between the line Vo and the line Po is found by equation (4), so the address of $\theta=\alpha+\Delta\theta$ is found relative to the address of $\theta=0$ at the home position K, the image at the point P as the image acquisition point is read out from the memory unit 2, the angle $\phi'$ between the line VP and the line Po is found, the address at the position of the angle $\phi'$ from the center of the image (point B in FIG. 4) is found, and the image information is extracted. In the case of acquiring images along one curve, one vertical line's worth or one horizontal line's worth of the image information is extracted. In the case of acquiring images along a plurality of curves or curved surfaces, the image information showing the pixels of the address or the image information is extracted. This image information is created by the images corresponding to the range of angle $\phi$ desired and combined, whereby it is possible to generate the image of a three-dimensional object from any viewpoint. That is, the intersection with the curve (or curved surface) is used as the address of the image at the time of image acquisition or the angle $\phi'$ corresponding to the line of sight direction is used as the address for extracting the image information in the images. Accordingly, the image information corresponding to a line of sight is extracted from the plurality of images and combined to generate a three-dimensional image from the specified viewpoint V.

As explained above, the present invention acquires images of a three-dimensional object 7 seen from a plurality of positions and stores them in a memory unit 2 and, when any viewpoint is specified the image information corresponding to the line of sight from any viewpoint is read out from the memory unit 2 and combined based on the address of the viewpoint and the address at the time of image acquisition, whereby it is possible to generate an image of the three-dimensional object 7 from any viewpoint. Accordingly, since calculation of addresses for just a 2-D structure is enough and there is no need to reconstruct the three-dimensional structure, there is the advantage that the amount of computation becomes smaller and it is possible to generate images fast and economically.

We claim:

1. A method of image generation comprising:

acquiring images of a three-dimensional object as seen from a plurality of different positions and storing them in a memory unit;

finding a first address of a position where an image was acquired based on positional information at an arbitrary specified point regardless of said positions from which the images are acquired;

calculating a second address of an image stored in the memory unit corresponding to the direction of a line of sight from the specified point; and combining the image information read by the first and second addresses to generate the image of the three-dimensional object from the specified point.

2. A method of image generation as set forth in claim 1, wherein said acquiring comprises acquiring images of the three-dimensional object seen from a plurality of positions along one or more curves encompassing part or all of the three-dimensional object and storing the same in the memory unit.

3. A method of image generation as set forth in claim 1, wherein said acquiring comprises acquiring images of the three-dimensional object seen from a plurality of positions on a curved surface encompassing part or all of the three-dimensional object and storing the same in the memory unit.

4. A method of image generation comprising:

acquiring images of a three-dimensional object as seen from a plurality of different positions and storing them in a memory unit;

finding a first address of a position where an image was acquired based on positional information at a specified point;

calculating a second address of an image stored in the memory unit corresponding to the direction of a line of sight from the specified point; and combining the image information read by the first and second addresses to generate the image of the three-dimensional object from the specified point, wherein said acquiring comprises acquiring images of the three-dimensional object seen from positions at predetermined intervals along one or more curves on a curved surface encompassing part or all of the three-dimensional object and storing them in the memory unit, wherein said finding comprises finding the intersection between a line of sight from a specified point and the curve for image acquisition based on the positional information of the point and the curve, finding the angle from the intersection with respect to the direction of the three-dimensional object, finding the angle of the line of sight from the intersection to the direction of the three-dimensional object, and calculating the first address of the image at the intersection as the image acquisition position and the second address at the position corresponding to the line of sight of the image, wherein said combining comprises reading the image information stored in the memory unit based on the first and second addresses, combining the image information corresponding to each line of sight from the specified point, and generating the image of the three-dimensional object seen from the specified point.

5. A method of image generation as set forth in claim 4, wherein said finding comprises finding the trajectories connecting identical points of the three-dimensional object in the images for each predetermined interval, and interpolating between images based on these trajectories.

6. A method of image generation comprising:

acquiring images of a three-dimensional object as seen from a plurality of different positions and storing them in a memory unit;

finding a first address of a position where an image was acquired based on positional information at a specified point;

calculating a second address of an image stored in the memory unit corresponding to the direction of a line of sight from the specified point; and combining the image information read by the first and second addresses to generate the image of the three-dimensional object from the specified point, wherein said acquiring comprises acquiring images of the three-dimensional object seen from positions at predetermined intervals along one or more curves on a curved surface encompassing part or all of the three-dimensional object and storing the same in the memory unit, wherein said finding comprises finding the trajectories connecting identical points of the three-dimensional object in the images for each predetermined interval, and interpolating between images based on these trajectories.

7. A method of image generation comprising:

acquiring images of a three-dimensional object as seen from a plurality of different positions and storing them in a memory unit;

finding a first address of a position where an image was acquired based on positional information at a specified point;

calculating a second address of an image stored in the memory unit corresponding to the direction of a line of sight from the specified point;

combining the image information read by the first and second addresses to generate the image of the three-dimensional object from the specified point; and finding the amount of motion and direction of motion between frames for a moving three-dimensional object and moving the curve for acquiring the images of the three-dimensional object in accordance with that amount of motion and direction of motion to generate the addresses.

8. An image generation apparatus comprising:

image acquisition means for acquiring images of a three-dimensional object from a plurality of positions along a curve on a curved surface encompassing part or all of the three-dimensional object;

a memory unit for storing the images obtained by the image acquisition means, an address generating unit for calculating a second address for reading image information corresponding to each line of sight from a specified point based on the positional information of the specified point and a first address at the position of image acquisition;

an image generation processing unit for combining the image information read out from the memory unit by the read addresses from the address generating unit to generate the image of the three-dimensional object seen from the specified point; and display equipment for displaying the image generated by the image generation processing unit.

9. An image generation apparatus comprising:

image acquisition means for acquiring images of a three-dimensional object from a plurality of positions along a curve on a curved surface encompassing part or all of the three-dimensional object;

a memory unit for storing the images obtained by the image acquisition means, an address generating unit for calculating a second address for reading image information corresponding to each line of sight from a specified point based on the positional information of the specified point and a first address at the position of image acquisition;

an image generation processing unit for combining the image information read out from the memory unit by the read addresses from the address generating unit to generate the image of the three-dimensional object seen from the specified point; and display equipment for displaying the image generated by the image generation processing unit, wherein said address generating unit calculates the intersection of the curve for image acquisition and the line of sight from the specified point based on the positional information for the specified point, calculates the angle from the intersection with respect to the direction of the three-dimensional object, finds the angle of the line of sight from the intersection to the direction of the three-dimensional object, and calculates the first address of the image at the intersection as the image acquisition position and the second address at the position corresponding to each said line of sight for the image.

10. An image generation apparatus comprising:

image acquisition means for acquiring images of a three-dimensional object from a plurality of positions along a curve on a curved surface encompassing part or all of the three-dimensional object;

a memory unit for storing the images obtained by the image acquisition means, an address generating unit for calculating a second address for reading image information corresponding to each line of sight from a specified point based on the positional information of the specified point and a first address at the position of image acquisition;

an image generation processing unit for combining the image information read out from the memory unit by the read addresses from the address generating unit to generate the image of the three-dimensional object seen from the specified point; and display equipment for displaying the image generated by the image generation processing unit, wherein said image generation processing unit is configured to interpolate between images based on the trajectories connecting identical points of the three-dimensional object in images stored in the memory unit.

* * * * *

UNITED STATES PATENT AND TRADEMARK OFFICE
CERTIFICATE OF CORRECTION

PATENT NO.:     5,831,619
DATED      :    November 3, 1998
INVENTOR(S):    Akira NAKAGAWA et al.

It is certified that error appears in the above-identified patent and that said Letters Patent is hereby corrected as shown below:

Col. 7,    line 28, change "light" to --line--.

Col. 10,   line 25, delete "(".

Signed and Sealed this

Twentieth Day of April, 1999

Attest:

Q. TODD DICKINSON

Attesting Officer     Acting Commissioner of Patents and Trademarks